May 23, 1944.  J. SUNNEN  2,349,526
BORING MACHINE
Filed Feb. 3, 1940  5 Sheets-Sheet 1
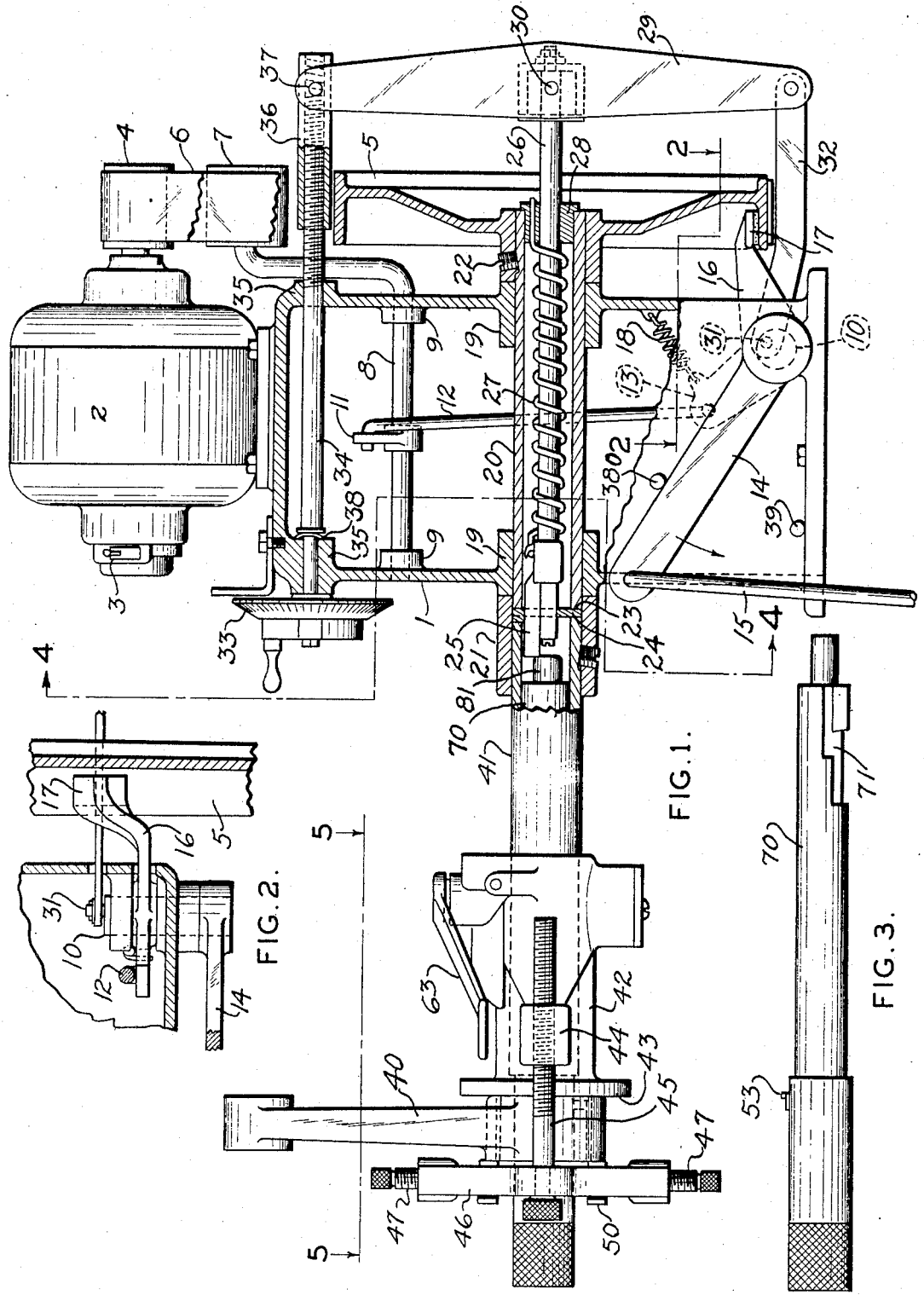
INVENTOR.
JOSEPH SUNNEN
BY George R. Ericson
ATTORNEY.

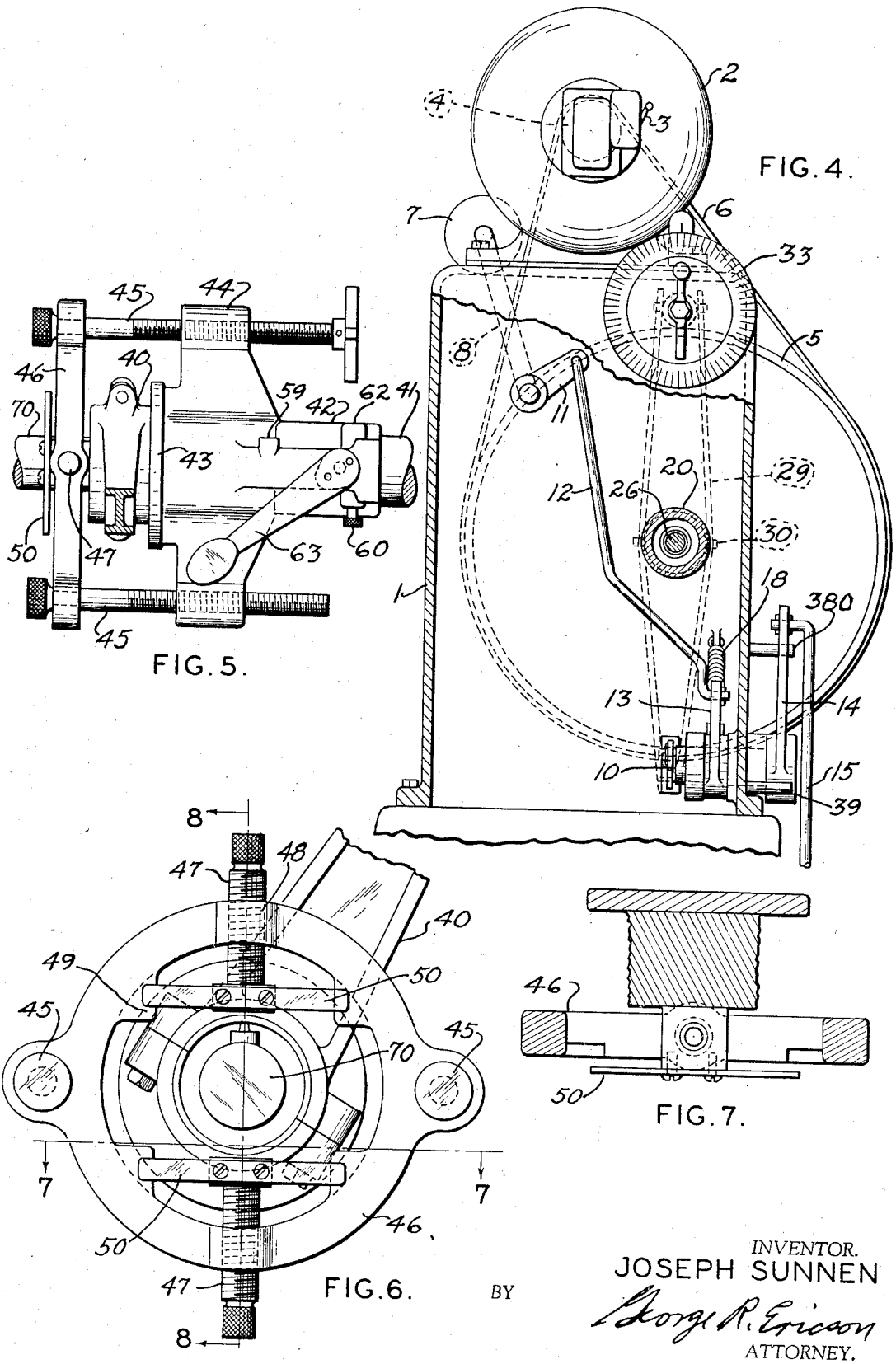

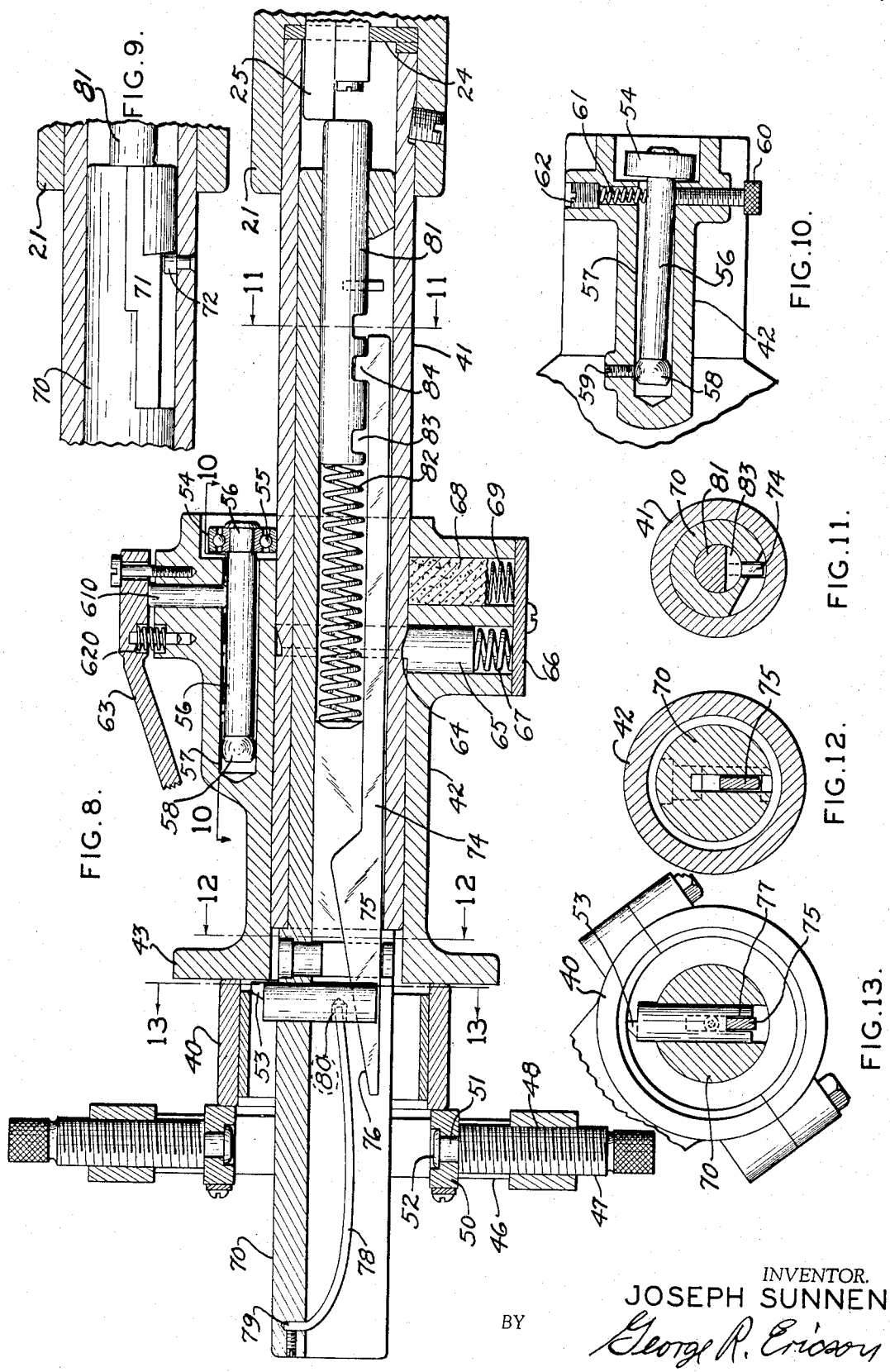

May 23, 1944.  J. SUNNEN  2,349,526
BORING MACHINE
Filed Feb. 3, 1940  5 Sheets-Sheet 4

INVENTOR.
JOSEPH SUNNEN
BY *George R. Ericson*
ATTORNEY.

May 23, 1944. J. SUNNEN 2,349,526
BORING MACHINE
Filed Feb. 3, 1940 5 Sheets-Sheet 5

INVENTOR
JOSEPH SUNNEN
George R. Ericson
ATTORNEY

Patented May 23, 1944

2,349,526

UNITED STATES PATENT OFFICE 2,349,526

BORING MACHINE

Joseph Sunnen, Clayton, Mo.

Application February 3, 1940, Serial No. 317,074

35 Claims. (Cl. 77—3)

This invention relates to machine tools and particularly to connecting rod boring machines. The machine shown herein is especially intended for boring out the big ends and bearing shells of connecting rods for internal combustion engines and finishing or refinishing them to an exact specified dimension, but it will be understood that the machine may be used for other purposes and numerous modifications of the specific structure shown made within the scope of the invention.

One of the features of the machine is the provision of means for centering the connecting rod or other device with respect to the boring bar and for accurately gauging the size of the hole as well as for quickly adjusting the tool position to position for boring a hole of any specified diameter.

Another feature of the machine is the provision of a new and improved power feeding mechanism having an infinitely variable rate of feed, the same being readily controllable by the pressure of the thumb on a lever.

Another feature of the machine is the provision of an improved stop mechanism for limiting the feed of the boring tool so that it will not cut into the chuck, and so that the stop may be used to position the tool for squaring off the ends or forming a chamfer without the necessity of the operator having to look in and observe the position of the tool from the outer end of the bar.

Another feature of the invention is the provision of a readily attachable or removable boring bar which can be adjusted to position, removed, and replaced in the same position in the most convenient manner possible.

Another feature of the machine is the provision of a new and improved centering device for centering the work with respect to the boring bar.

Another feature of the machine is the provision of a new and improved device for boring bearing shells.

The invention will be better understood, and other objects and advantages will appear from the following description and accompanying drawings, referring to which:

Fig. 1 is a partially sectional elevation of my new and improved rod boring machine, showing a connecting rod in position to be bored.

Fig. 2 is a sectional detail plan view taken along the broken section line 2—2 of Fig. 1, showing a part of the starting and stopping mechanism.

Fig. 3 is a detail view showing a preferred form of boring bar.

Fig. 4 is a sectional elevation of the rod boring machine, taken along the broken section line 4—4 of Fig. 1.

Fig. 5 is a detail plan view showing the work holding mechanism, taken on line 5—5 of Fig. 1.

Fig. 6 is a front elevation of the parts shown in Fig. 5.

Fig. 7 is a sectional detail view, showing parts of the work holding device.

Fig. 8 is a longitudinal sectional view of the work holding and feeding mechanism and the boring bar.

Fig. 9 is a detail view, showing the bayonet joint mechanism for holding the boring bar in the spindle.

Fig. 10 is a detail sectional plan view, taken along the section line 10—10 of Fig. 8, showing the feed mechanism.

Fig. 11 is a cross sectional view of the spindle and boring bar, taken along the section line 11—11 of Fig. 8.

Fig. 12 is a cross sectional view, taken along the section line 12—12 of Fig. 8.

Fig. 13 is a cross sectional view, taken along the section line 13—13 of Fig. 8.

Figure 14:
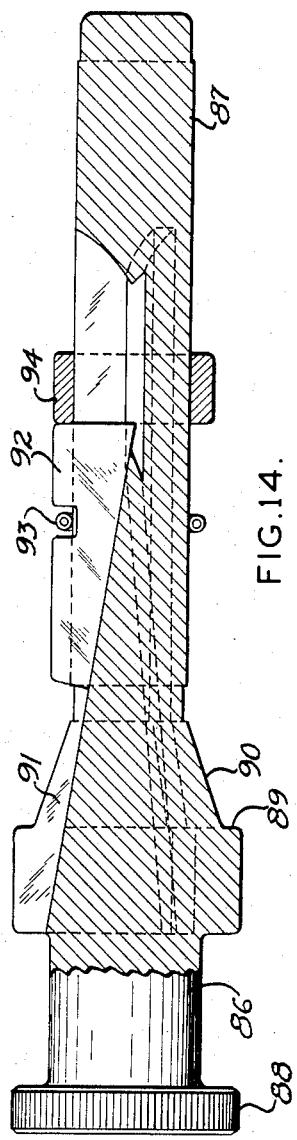
Fig. 14 shows the centering device which I provide for quickly and accurately centering the connecting rod with respect to the spindle, parts being in section and others broken away.

The reference numeral 1 indicates the frame of the boring machine on which is mounted a motor 2 having a control switch 3. The motor is provided with a pulley 4 which drives a main pulley 5 by means of the belt 6. The belt may be tightened or loosened by means of the idle pulley 7, which is eccentrically mounted on the idler shaft 8. The frame 1 is provided with suitable bearings 9 for rotatably supporting the idler shaft, and a counter shaft 10 is mounted in the frame transversely to the idler shaft. The idler shaft is provided with a rigidly mounted lever 11 connected by the link 12 to a lever 13 rigidly fixed to the counter shaft 10 which is also provided with a rigidly mounted operating lever 14 connected to any suitable means of control, such as a foot pedal, for instance, by the link 15. A brake lever 16 is rigidly mounted on the counter shaft 10 and provided with a brake member 17, frictionally contacting a cylindrical track on the inner side of the main drive pulley 5. The brake is normally held in contact with the drive pulley by means of the tension spring 18 which is attached to the lever 13. It will be noted that when the brake 17 is in contact with the drive pulley, as shown in Fig. 1, the idler pulley 7 is out of contact with the belt 6, as more clearly indicated in Fig. 4.

The frame is provided with main bearings 19, in which is mounted the main spindle 20. This spindle is provided with an enlarged portion 21 having a shoulder which abuts an end of the front main bearing and the main drive wheel 5 is mounted on the projection rear end of the spindle and held in position by any suitable means such as the set screw 22.

The spindle 20 is provided with a longitudinal bore having an enlarged portion at the front end and a shoulder 23 against which is seated a plate 24 which is provided with an eccentric opening to receive the tool control plunger 25. This plunger is mounted on a shaft 26, which is normally held in retracted position by the tension spring 27, which has one end hooked over the plunger 25 and the other end attached to the plug 28 fixed in the rear end of the spindle 20. The shaft 26 is operated by means of the rocker arm 29 to which it is pivoted as indicated at 30, one end of the rocker arm being connected to the pin 31 which is eccentrically mounted on the shaft 10 by means of the link 32 and the other end being adjustable by means of the graduated hand wheel 33 which is mounted on the shaft 34. This shaft is rotatably mounted in the bearings 35 in the frame and is screw threaded to the member 36 which is pivoted to the rocker arm 29 as indicated at 37. The shaft 34 is firmly held against longitudinal back lash in the frame by means of the spring washer and shoulder construction indicated at 38.

The lever 14 is normally held in contact with the stop 380 by means of the spring 18 when the machine is out of operation and it is intended to be held firmly against the stop 39 whenever any boring is being done and it may be noted here that when the foot pedal or other control is released the shaft 10 turns slightly in a clockwise direction with respect to Fig. 1 and the rotation of the pin 31 about the center of the shaft 10 results in a slight but definite withdrawal of the shaft 26 to the right with respect to Fig. 1 so that the cutting tool will be drawn inwardly to avoid scoring the finished surface by mechanism which will hereafter be described.

Figure 16:
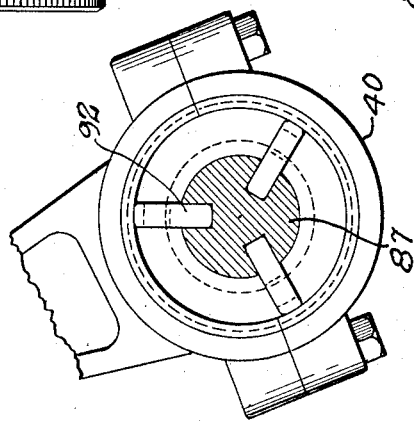
Fig. 16 is a cross sectional view taken on the section line 16—16 of Fig. 15.

The work, which may for instance be a connecting rod 40, is mounted in a work holding mechanism or check which is rotatably and slidably mounted on an extension 41 having a bore accurately fitted to the cylindrical surface of the spindle extension 41 and having a flange or face plate 43 against which one end of the work is to be clamped. The chuck 42 is provided with a pair of side extensions 44 which are screw threaded to receive the adjusting screws 45. A clamp 46 is mounted on the screws 45 and provided with transverse screws 47 screw threaded into the ring shaped clamp 46 as indicated at 48. The clamp is provided with inwardly extending parallel ways 49 which carry adjustable contact members 50. These contact members are rotatably mounted on the inner ends of the screws 47 which are provided with a turned down portion 51 riveted over at the inner side of the contact members 50 as indicated at 52. This adjustable feature permits the adaptation of the chuck to boring rods of widely different sizes. The centering of the work is done before the tightening of the clamp through 45 and the centering mechanism is shown in Figs. 14 and 16 inclusive, which will hereafter be described in detail.

With the work held in the chuck, as shown in Figs. 5, 6, and 8, the cutting tool 53 is rotated by the spindle and boring bar and the cylindrical boring is accomplished by sliding the chuck 42 along the spindle while manually holding the chuck and the work against rotation. The feeding of the chuck along the spindle extension 41 is accomplished by means of the roller 54. This roller is mounted on a ball bearing 55 which is fixed on the shaft 56. This shaft is loosely carried in a bore 57 formed in the body member 42, and the inner end of the shaft is provided with a spherical section 58, having a recess at one side to receive the point of the locating screw 59. An adjusting screw 60 is mounted at one side of the shaft 56 and a spring 61 is held in position to oppose the action of the screw 60 by means of the screw plug 62. As will be seen by reference to Figs. 8, 10, and 5 the axis of the shaft 56 and roller 54 may be adjusted into or out of parallelism with the axis of the spindle extension 41 in either direction by adjusting the screw 60.

The roller 54 may be pressed into contact with the spindle extension 41 by the plunger 610 which is controlled by the spring 620 and a manually operated lever 63. Pressure on the lever 63 forces the plunger 610 into contact with the shaft 56 thereby causing it to ride firmly on the spindle 41, the friction being sufficient to drive the chuck along the spindle extension during the rotation thereof.

As long as the axis of the roller 54 is parallel to the axis of the spindle extension relative rotation between the spindle extension and the chuck 42 merely produce rotation of the roller 54, but when the screw 60 is adjusted to throw the axis of the shaft 56 out of parallelism with the axis of the spindle 41 as indicated in Fig. 10 rotation of the spindle 41 while the chuck 42 is held stationary produces a relative feeding of the chuck along the spindle so that the boring tool 53 can be fed regularly through the rod or shell which is being bored.

In order to prevent the chuck 42 being moved too far to the left with respect to Fig. 8 which would result in the boring tool 53 boring into the flange 43 I provide a circular groove or shoulder 64 and a spring pressed plunger 65 normally held in contact with the spindle extension 41 by the cover plate 66 and spring 67. This plunger 65 may be held against rotation by any suitable means such as a key-way (not shown) and is provided with a shoulder conformed to the shoulder 64 to limit the movement of the chuck along the spindle extension. A grease pack 68 held in contact with the spindle extension by the light spring 88 may also be provided. The boring bar 70 is fitted into the bore of the spindle extension and is quickly attachable or detachable by means of the bayonet joint construction 71 engaging the pin 72 which is mounted in the spindle extension 41 as shown in Figure 9. The boring bar is longitudinally slotted at one side to receive the tool control cam 74. This member is provided with a head 75 having a cam surface 76 which extends through the slot 77 in the boring tool and slidably contacts the bottom of the slot and moves toward the work against the pressure of the spring 78 which has one end rigidly mounted in the boring bar as indicated at 79 and the other end projecting into an opening 80 in the boring tool. The spring tends to withdraw the boring tool and its action is limited by the cam surface 76. Slidably mounted in the rear end of the boring bar is a plunger 81 which is biased toward the right with respect to Fig. 8 by means of the compression spring 82. The plunger 81 is provided with a plurality of longitudinally spaced notches 83 to receive projection 84 at the rear end of the tool operating member 74. By selectively locating the projection 84 in the notches 83, a wide range of radial movement of the tool 53 is obtainable. The plunger 81 contacts the end of the tool controlling plunger 25 and is longitudinally movable with respect to the boring bar by operation of the graduated hand wheel 33. It will be understood that the graduations on the hand wheel, the pitch of the thread on the shaft 34, the proportions of the rocker arm and pivots 29, 30 and 37 and the taper of the cam surface 76 are so correlated as to produce a direct reading of the radial movement of the tool 53 in thousandths of an inch or millimeters as desired. By this arrangement the operator is enabled to bore a hole, remove the boring bar, measure it by means of the gauge, (hereinafter described), replace the boring bar, and reset the boring tool to the exact thousandth of an inch without difficulty.

In this connection it will be noted that the cam member 31 is always returned to the same position by the spring 18 when the machine is out of operation and always advanced to the same position when the spindle is running so that the tool position during operation is not subject to variation on this account. It may be noted that the operator should be instructed to firmly press down the foot pedal when he desires to operate the spindle, so that the lever 14 will be brought firmly down against the stop 39.

Figure 17:
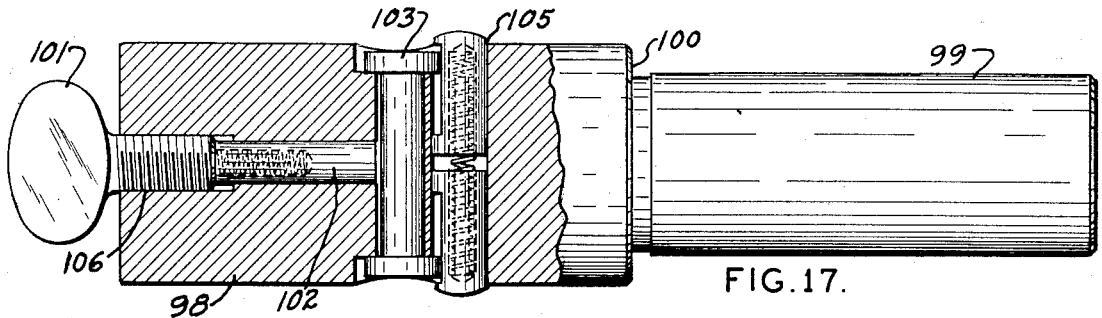
Fig. 17 is a longitudinal view, with parts in section, of the gauge which I provide for measuring the diameter of the bore.
Figure 18:
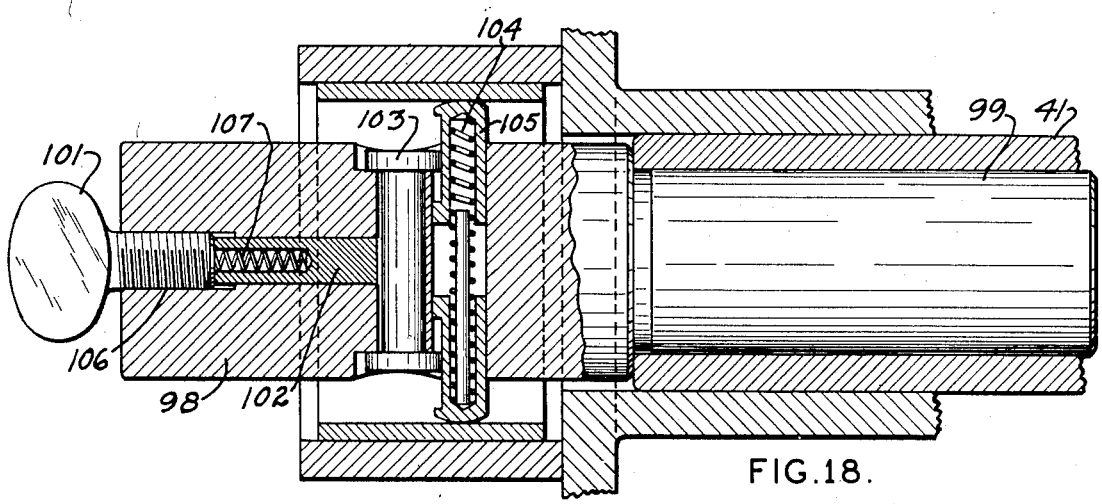
Fig. 18 is a view similar to Fig. 17, also showing the gauge in position in the spindle and showing parts of the work holding mechanism or chuck and the boring bar.

After boring a trial hole in the connecting rod 40 the operator stops the spindle and withdraws the boring bar by rotating it manually in a clockwise direction about a quarter turn which disengages the bayonet slot. As the bar is withdrawn spring 82 withdraws the cam head 75 and allows the withdrawal of the boring tool by the spring 78, thus further insuring that there will be no scratching of the surface of the hole by the tool. The bar is then withdrawn from the spindle extension and the hole is measured by means of the gauge hereinafter described which is specifically shown in Figs. 17 and 18.

Figure 15:
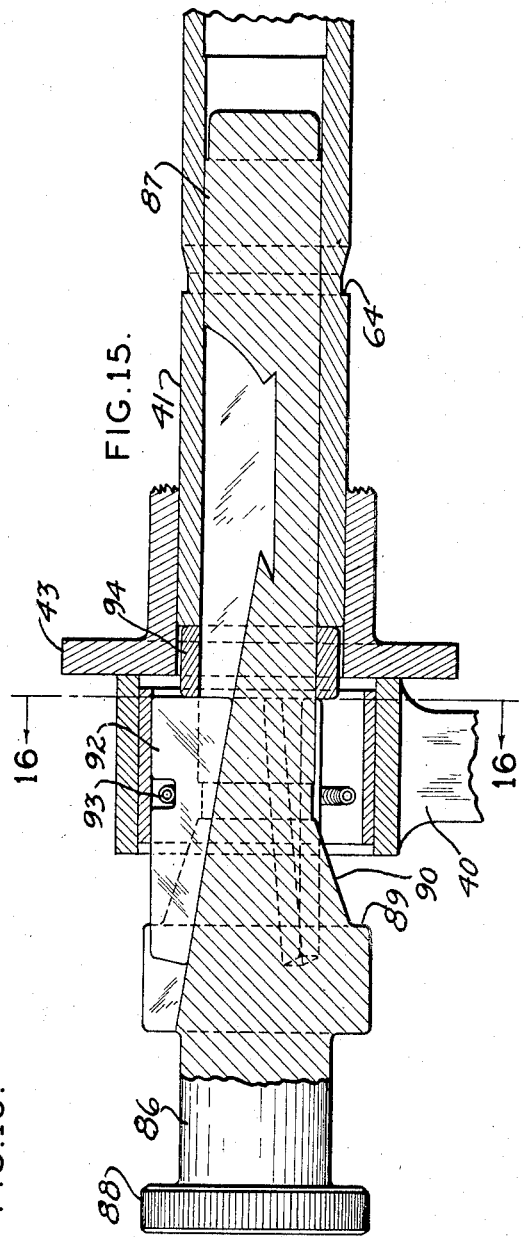
Fig. 15 is another view of the centering device, showing parts of the work holding mechanism, spindle, and the rod which is being centered.

The original centering of the rod which is to be bored with respect to the chuck and spindle is accomplished with the aid of the centering tool which is best shown in Figs. 14, 15 and 16. The centering tool comprises a cam body member 86 having a shank 87 accurately finished to slidably fit in the bore of the spindle extension 41 when the boring bar 70 is removed. The outer end of the centering tool is provided with a knurled handle 88 and shoulder 89 having a tapered extension 90. Between the tapered portion and the shank 87 three longitudinal slots 91 are formed to receive the jaws 92 which are resiliently held in position by the circular coil spring 93.

The slots 91 are tapered at the bottom on an angle which is the supplement of a similar angle at the inside of the centering jaws 92, and the jaws are so formed that as they are moved along the shank to the right or left with respect to Figs. 14 and 15 the inner side of the jaws is held in contact with the bottom of the slots 91 by the spring 93 and the outer edges of the jaws are equidistant from the axis of the centering tool. A sleeve 94 is slidably mounted on the shank 87 and arranged to contact the ends of the jaws 92 so as to slide them along the cam surface at the bottom of the slots 91.

The connecting rod 40 being placed in juxta-position to the flange member 43 and with its big end bore manually aligned with the opening in the end thereof, the shank 87 of the centering tool is inserted in the bore in the sleeve extension 41. It will be understood, of course, that the boring bar has been removed for the centering operation. The centering tool is then manually moved into the bore of the spindle sleeve until the sleeve 94 contacts the end of the spindle sleeve. Further movement causes the jaws 92 to be slid upwardly along the cam surfaces until further movement is limited by the bore of the connecting rod which limitation of the movement results in the centering of the connecting rod with respect to the spindle sleeve. This having been done the jaws 50 of the clamp are roughly adjusted as indicated in Figs. 6 and 8, the clamp screws adjusted first loosely and then more firmly to hold the connecting rod in position to be bored. Once the connecting rod is firmly adjusted in position the centering tool is withdrawn and the boring bar is inserted so that a preliminary cut may be taken from the connecting rod bore. After this has been done the setting of the hand wheel 33 is noted, the spindle stopped. The tool being withdrawn by the cam 31, the hand lever 63 being released to permit the chuck 42 to be slid along the spindle extension 41 toward the left with respect to Fig. 8 so as to move the work out away from the tool. It will be noted that while the screw 60 can be adjusted to throw the axis of the shaft 56 out of line with the spindle shaft in either direction it is preferred to have the feet so adjusted as to cause the work to be moved from the position shown in Fig. 8 to the right with respect to that figure along spindle extension 41 so that the chips cut by the boring tool 53 will be pushed outwardly along the bearing ahead of the boring bar. This results in clearing the chips in a much more satisfactory manner than if the feed was in the opposite direction.

Once a preliminary cut has been taken the boring bar is removed and the gauge is inserted. The gauge comprises a main body member 98 having a shank 99 which slides into the bore of the spindle extension 41 until a shoulder 100 contacts with the end of the spindle extension. Set screw 101 is then released to relieve the pressure of the plunger 102 on the pressure block 103, which permits the spring 104 to move the gauge contact members 105 outwardly to contact the bore which has been formed in the connecting rod 40. When this has been done the set screw 101 is again tightened acting through the plunger 102 and pressure block 103 to lock the gauge members in position and the gauge is then removed from the spindle extension so that the distance between the ends of the members 105 can be measured by any suitable means, such as a micrometer. Once the size of the preliminary bore has been determined the amount of adjustment of the graduated hand wheel 33 to produce the finished bore can be readily calculated and the bore can be completely finished in most cases at the second operation.

While the construction and operation of the gauge will be fully understood from the above description, it may be noted that the body member 98 is threaded at 106 to receive the set screw 101 and a spring 107 is provided to maintain slight frictional contact between the pressure block 103 and the gauge members 105 which are mounted in a cross passage in the body member 98. The ends of the members 105 are spherical or cylindrical to a radius not greater than the radius of the member 98 and are pressed inwardly to their limit positions and tightened by means of the set screw 101 before insertion into the bore.

Figures 19, 20:
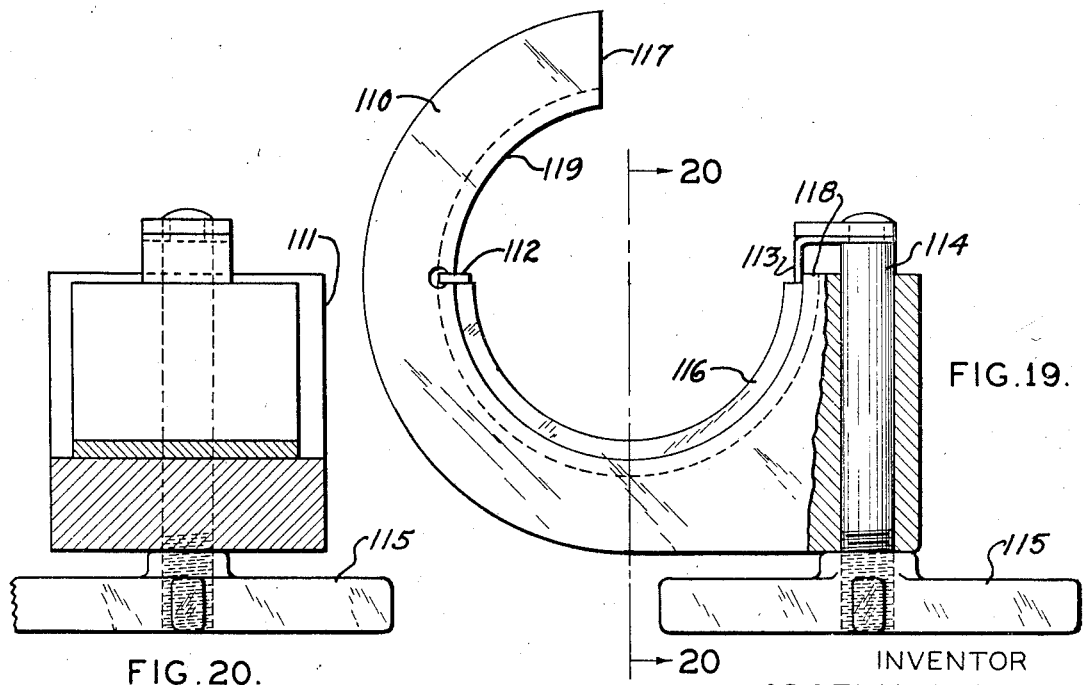
Fig. 19 is an end elevation of an adapted for boring bearing shells.
Fig. 20 is a cross sectional view taken along the section line 20—20 of Fig. 19.

I have shown in Figs. 19 and 20 a fixture which may be used in connection with this machine for performing a new and improved method of boring bearing shells. The fixture comprises a body member 110 which is partially cylindrical and has parallel ends 111, a stop member 112 is provided at one side and a clamp member 113 at the other. The clamp is adjustably held in position by the screw 114 threaded at the hand wheel 115 by means of which it may be drawn down against the bearing shell 116. The fixture may if desired be provided on its face with a circular tongue or groove to fit a corresponding formation in the chuck so as to be self-centering.

The utility of this device is due to the fact that in modern connecting rods the bearing surface is frequently in the form of parallel semicylindrical shells and it is desirable to provide a convenient means for accurately refinishing the inside bearing surfaces of these shells to a predetermined size while maintaining concentricity of the inner and outer surfaces.

In order to accomplish this I first center the fixture 110 in the chuck 42 and clamp it against the flange 43 the same as in the case of a connecting rod which is to be bored. It will be noted that while a section of the fixture 110 between the surfaces 117 and 118 is cut out for approximately 90 degrees, this does not interfere with the centering operation between the three jaws of the centering tool spaced at 120 degrees. This centering of the fixture 110 is done before the insertion of the bearing shell 116. After the fixture has been centered the bearing shell is inserted between the stop 112 and the clamp 113 and drawn down firmly by means of the hand wheel 115 so that the bearing shell is bent or forced into contact with the bore 119 of the fixture.

Bearing shells of this character come in widely varying sizes so that one can scarcely hope to have a fixture with a different bore to fit each size of bearing shell which may require to be bored, but by the practice of the method herein outlined it is necessary to provide only one fixture to take care of a number of different sizes of bearing shells. In clamping the bearing shell into the fixture it is bent into a cylindrical position so that parallelism of the interior of the shell and the exterior is insured. This bending is usually and preferably within the limit of elasticity of the bearing shell so that after the boring operation the shell springs back to its original outside diameter and one is able to obtain an accurate cylindrical shell having the desired diameter as the result of having bored it to a different diameter.

The shell is bored the same as any other connecting rod bearing except that the operator must calculate the desired thickness of the shell instead of the desired internal diameter. Having calculated this desired thickness it is a simple matter to measure this thickness while the fixture is held in the chuck 42 and the operator may be assured that when the shell has been bored to the proper thickness it will also have the proper internal diameter after it has been removed from the fixture.

The above described method and apparatus is capable of substantial modification and it is my desire to be limited in my protection only in accordance with the scope of the following claims and those which may be presented in certain divisional applications which are to be filed in connection herewith.

I claim:

1. In a machine of the type described, a frame including a bearing, a spindle rotatably mounted in said bearing, a source of power, a drive between said spindle and source of power, a control for said drive, a cutting tool carried by and rotatable with said spindle, means for adjusting said tool to exact cutting position, automatic means for moving said cutting tool into or out of cutting position without interfering with the adjustment of the cutting position, said automatic means being constructed and arranged to move said cutting tool into cutting position upon actuation of said power control and to withdraw said tool from cutting position when the operation of the spindle is stopped.

2. In a machine of the type described, a frame including bearings, a hollow spindle rotatably supported in said bearings, a boring bar including a normally retracted cutting tool supported by said spindle, means for adjusting the cutting position of said tool, work supporting means slidably mounted with respect to said spindle, drive means for said spindle and means connected with said drive means for simultaneously engaging said drive means and moving said cutting tool into work engaging position without interfering with the adjustment of the cutting position of said tool.

3. In a boring machine including a frame and a bearing carried by said frame, a rotatable hollow spindle mounted in said bearing, a source of power, a work holder slidably and rotatably mounted with respect to said spindle, drive means between said spindle and source of power, means controlling said drive means, a boring bar including a cutting tool extending into and supported by one end of said spindle, said cutting tool being shiftable into and out of work engaging position, a shiftable control rod extending into the opposite end of said spindle, means operatively connecting the control rod and the drive control means whereby the operation of the latter will shift said control rod, and means interposed between said control rod and cutting tool for moving the latter into work engaging position upon operation of said drive control means.

4. In a boring machine including a frame, bearings carried thereby, a hollow spindle mounted in said bearings, means for rotating said spindle, brake means for stopping said spindle, a boring bar mounted in one end of said spindle having a cutting tool movable into and out of work engaging position, said cutting tool being normally out of work engaging position, cam means within said spindle normally engaging said cutting tool for moving the latter into work engaging position, a control rod for actuating said cam means arranged in the opposite end of said spindle and normally connected with said cutting tool, and means associated with said cam means and said control bar and so constructed and arranged that said cutting tool is moved out of work engaging position when said brake means is operated.

5. A boring apparatus including a frame, bearings carried by the frame, a rotatable spindle mounted in said bearings, a source of power, means for driving said spindle from said source of power, brake means for said spindle, control means for alternatively engaging said brake and said drive, a boring bar detachably mounted on said spindle, said boring bar having a radially adjustable cutting tool, means for adjusting the radial position of said cutting tool, a work holder rotatably and slidably mounted on said spindle, and automatic means for partially withdrawing said cutting tool when said brake is applied.

6. A boring apparatus including a rotatable spindle having a concentric bore, a boring bar having a cutting tool, said boring bar being detachably mounted with respect to said spindle, a work holder including a main body member slidably and rotatably mounted with respect to said spindle and having work holding means, and gauge means constructed and arranged to be mounted in said bore of said spindle for gauging work in said work holder.

7. A boring apparatus including a rotatable spindle having a concentric bore, a boring bar having a cutting tool, said boring bar being detachably mounted in said bore, a work holder including a main body member slidably and rotatably mounted with respect to said spindle and having work holding means, and a centering device constructed and arranged to be mounted in said bore of said spindle upon removal of said boring bar.

8. In a boring machine, a frame, bearings mounted on said frame, a rotatable hollow spindle mounted in said bearings, a source of power, drive means from said source of power to said spindle, control means between the source of power and the spindle, brake means for said spindle, said brake means being operative upon disconnecting said drive means, a boring bar removably mounted in one end of said spindle, a radially adjustable cutting tool carried by said boring bar, cam means for adjusting the position of said cutting tool, a control element in said spindle for actuating said cam means, and means operated by said control element for shifting said cam.

9. In a device of the class described, a frame, bearings mounted on said frame, a rotatable hollow spindle mounted in said bearings, a source of power, spindle drive means connecting said source of power and said spindle, control means for controlling the spindle drive means, brake means for said spindle, said brake means being operative upon disconnecting said spindle drive means, a boring bar removably mounted in one end of said spindle, a radially adjustable cutting tool, cam means for adjusting the position of said cutting tool and means including a micrometer adjustment for actuating said cam means.

10. In a device of the class described, a frame, bearings mounted on said frame, a rotatable hollow spindle mounted in said bearings, a source of power, spindle drive means connecting said source of power and said spindle, control means for controlling the spindle drive means, brake means for said spindle, said brake means being operative upon disconnecting said spindle drive means, a boring bar removably mounted in one end of said spindle, a radially adjustable cutting tool, cam means for adjusting the position of said cutting tool, means including a micrometer adjustment for actuating said cam means, and means operated by said control means for further controlling said cam means.

11. A device as described in claim 9, and further characterized by the provision of means for shifting the cam in a direction to withdraw the cutting tool comprising a coiled spring positioned intermediate the cutter element and the control bar.

12. In a boring apparatus, a frame including spaced bearings, a tubular spindle arranged for rotation in said bearings, means for intermittently driving said spindle, a boring bar detachably mounted in one end of said spindle and having a radially adjustable cutting tool, a work holder, said work holder including a body member slidably mounted on said spindle, said body member having a relatively adjustable work clamping member supported therefrom, a centering device including a member adapted to slidably fit into the end of the spindle upon removal of said boring bar, for centering work with respect to said spindle, and gauge means comprising a member adapted to slidably fit into the end of the spindle upon removal of said boring bar, and said centering device, whereby the operations essential to work completion may each be made with respect to the same associated part to insure accuracy and speed of production.

13. In a boring apparatus, a frame including spaced bearings, a tubular spindle arranged for rotation in said bearings, means for intermittently driving said spindle, a boring bar detachably mounted in one end of said spindle and having a radially adjustable cutting tool, a work holder, said work holder including a body member slidably mounted on said spindle, said body member having a relatively adjustable work clamping member supported therefrom, a centering device including a member adapted to slidably fit into the end of the spindle upon removal of said boring bar, for centering work with respect to said spindle, means for gauging work in said work holder upon removal of said boring bar, and said centering device, means for automatically retracting said cutting element upon removal of said cutter bar for gauging operation, and means for automatically restoring said cutting element to its position when the boring bar is replaced.

14. In a device of the type described, a frame including bearings, a hollow spindle rotatably supported in said bearings, means for intermittently rotating said spindle and control means therefor, a boring bar including a normally retracted cutting tool supported by said spindle, work holding means slidably mounted on said spindle, said work holding means including spaced clamping elements adjustably positioned at each side of said retractable cutting tool, means for limiting the movement of the work holding means with respect to said spindle, and means for moving the retractable cutting tool into work engaging position.

15. In a machine of the type described, a frame including bearings, a hollow spindle rotatably supported in said bearings, means for intermittently rotating said spindle and control means therefor, a boring bar including a normally retracted cutting tool supported by said spindle, work holding means slidably mounted on said spindle, said work holding means including spaced clamping elements adjustably positioned at each side of said retractable cutting tool, radially adjustable contact members carried by one of said clamping elements, manual means for limiting the movement of the work holding means with respect to the spindle, and cam means for moving the retractable cutting tool into work engaging position.

16. In a machine of the type described, a frame including bearings, a hollow spindle rotatably supported in said bearings, means for intermittently rotating said spindle and control means therefor, a boring bar including a normally retracted cutting tool supported by said spindle, work holding means slidably and rotatably mounted on said spindle, said work holding means including spaced clamping element adjustably positioned at each side of said retractable cutting tool, radially adjustable contact members carried by one of said clamping elements, said contact members having guiding contact with the clamping element at spaced points, means for limiting the movement of the work holding means with respect to the spindle, cam means for moving the retractable cutter into work engaging position, a control rod arranged in said spindle for operating said cam means, and synchronized means cooperating with the control means for operating said control rod to project said cutting element into work engaging position upon rotation of the spindle.

17. In a machine of the type described, a frame including bearings, a hollow spindle rotatably supported in the bearings, a boring bar supported by the spindle, work supporting means, means for moving said work supporting means along said spindle including a shaft pivotally mounted at one end on said work supporting means, a roller mounted on the opposite end of said shaft said roller being movable into and out of firm rolling contact with said spindle, and means for shifting said shaft on its pivot whereby its axis may be moved to positions more or less parallel to the axis of the spindle, whereby the work supporting means may be fed along said spindle at a variable rate.

18. In a machine of the type described, a frame including bearings, a hollow spindle rotatably supported in the bearings, a boring bar supported by the spindle, work supporting means, means for moving said work supporting means along said spindle including a shaft having one end pivotally mounted on said work supporting means, a roller mounted on the opposite end of said shaft for firm rolling contact with said spindle, manual means for applying pressure to said shaft for increasing the firmness of the rolling contact between the roller and the spindle, means for shifting said shaft on its pivot radially of said spindle whereby the work supporting means may be fed along said spindle at a variable rate, and means for limiting the feeding of said work supporting means with respect to the spindle.

19. In a machine of the type described, a frame including bearings, a hollow spindle rotatably supported in the bearings, a boring bar detachably supported by the spindle, a radially adjustable cutting tool mounted on said boring bar, slidably and rotatably mounted work supporting means positioned on said spindle, means for feeding said work supporting means along said spindle including a shaft pivotally mounted at one end on said work supporting means, a roller mounted on the opposite end of said shaft for contact with said spindle manual means for applying pressure to said shaft for increasing the rolling contact between the roller and the spindle, and means for shifting said shaft on its pivot to move said roller radially of said spindle, the axis of said roller being normally positioned slightly out of parallel to the axis of the spindle, whereby the work supporting means may be fed axially along the spindle when the roller is firmly held in contact therewith.

20. In a device of the character described, a rotatable spindle, a cutter element carried by the spindle, a work supporting element slidably mounted with respect to said spindle, and means for feeding said work supporting means axially with respect to the spindle including a roller mounted for contact with said rotating spindle, means for holding said roller in an angular position with relation to the longitudinal axis of the spindle, and means for causing said roller to frictionally engage said spindle, whereby said work supporting means may be axially fed with respect to said spindle.

21. A device of the character described, a rotatable spindle, a cutter element carried by the spindle, a work supporting element slidably mounted with respect to said spindle, and means for shifting said work supporting means axially with respect to the spindle including a roller mounted for contact with said rotating spindle, means for holding said roller in an angular position with relation to the longitudinal axis of the spindle, means for causing said roller to firmly engage said spindle, whereby a relative feeding action of the work supporting element with respect to the spindle is obtained, and stop means for limiting the feeding movement of said supporting element with respect to said spindle.

22. In a device of the character described, a rotatable spindle, a boring bar carried by the spindle having a radially adjustable cutting tool, spring means for normally retaining said cutter element in retracted position, cam means for moving said cutter element toward work engaging position, a work supporting means mounted on said spindle for rotary and longitudinal movement, adjustable frictional means manually shiftable into engagement with said spindle for feeding said work support longitudinally of the spindle, a control rod extending into said spindle, and means for connecting the control rod with the cam.

23. In a machine tool, a rotatable spindle, a cutting tool or the like driven by said spindle, a work holding device, a roller connected to said work holding device, the axis of said roller being slightly out of parallel with the axis of the spindle, and means for releasably pressing said roller into frictional engagement with said spindle whereby relative rotation between said spindle and said work holding device will cause relative movement between the work holding device and the spindle.

24. In a machine tool, a rotatable spindle, a cutting tool or the like driven by said spindle, a work holding device, a roller connected to said work holding device, the axis of said roller being slightly out of parallel with the axis of the spindle, and means for releasably pressing said roller into frictional engagement with said spindle whereby relative rotation between said spindle and said work holding device will cause relative movement between the work holding device and the spindle, and means for adjusting the angularity of the axis of the roller with respect to the axis of the spindle.

25. In a device of the class described, a spindle, a boring tool carried by said spindle, a work holding chuck rotatably and slidably mounted with respect to said spindle, a roller carried by said chuck, said roller having an axis slightly out of parallelism with the axis of said spindle, and releasable means for producing firm rolling contact between said roller and said spindle, whereby a relative axial feeding action of said spindle and chuck is obtained by relative rotation of the spindle and chuck.

26. In a connecting rod boring machine, a rotatable spindle, a boring tool or the like carried by said spindle, said boring tool being capable of occupying a position to bore a diameter larger than the diameter of said spindle, a work holding chuck rotatably and slidably mounted on said spindle, said spindle and work holding device being provided with a cooperating retractable plunger and groove to limit the sliding action of said work holding device with respect to said spindle in one direction only, one side of said groove comprising an abrupt shoulder for the other side being formed with a taper to cause the retraction of said plunger and thereby permit relative movement of the chuck and spindle in one direction only.

27. In a connecting rod boring machine, a rotatable spindle, a boring tool or the like carried by said spindle, said boring tool being capable of occupying a position to bore a diameter larger than the diameter of said spindle, a work holding chuck rotatably and slidably mounted on said spindle, said spindle and work holding device being provided with a cooperating retractable plunger and groove to limit the sliding action of said work holding device with respect to said spindle in one direction only, one side of said groove comprising an abrupt shoulder for the other side being formed with a taper to cause the retraction of said plunger and thereby permit relative movement of the chuck and spindle in one direction only, and a friction grip feeding device for causing a relative feeding action of the chuck with respect to the spindle by relative rotation therebetween.

28. In a cutting machine for curved surfaces, a frame, bearings mounted on the frame, a rotatably hollow spindle mounted in the bearings, a source of power, drive means from said source of power to said spindle including, pulleys, a loose belt connecting said pulleys, belt tightening means, and operating means for said belt tightening means, brake means for said spindle, a boring bar removably mounted in one end of the spindle, a cutting element carried by said cutter bar, said cutting element being movable into and out of work engaging position, resilient means for normally retaining said cutter element out of said work engaging position, cam means for moving said cutter element into work engaging position, a control element in said spindle for actuating said cam means, a lever pivoted intermediate its ends to said control element, an adjusting means connected to one end of said lever, a rotatable shaft fixed to said frame, an operating lever mounted on said shaft, an extension on said operating lever connected to and actuating the brake mechanism for said spindle, treadle means connected to one end of said operating lever, a link connected at one end to the free end of the lever pivoted to said control element, the opposite end of said link being eccentrically pivoted to the rotatable shaft and means interposed between the control element and said cam means for releasing the latter from engagement with said cutting element upon removal of said boring bar from said spindle.

29. In a device of the class described, a frame, a spindle carried by said frame, an adjustable cutting tool supported by said spindle, a control shaft having a graduated dial, a control plunger having an operating connection for adjusting the position of said tool, and means operated by said control shaft for adjusting the position of said plunger, said means comprising a member having a screw threaded connection with said control shaft and a rocker arm connected to said member and said plunger.

30. A boring bar comprising a body member having a longitudinal slot therein, a cam member slidably mounted in said slot, a transverse opening in said boring bar, a cutting tool slidably mounted in said transverse opening, said cutting tool having a portion contacting said cam surface for adjustment thereby, a control plunger slidably mounted in said boring bar, and means forming an adjustable connection between said control plunger and said cam member.

31. A boring bar comprising a body member having a longitudinal groove therein, a cam member slidable in said groove, a boring tool carried by said boring bar and adapted to be adjusted by said cam, a control member slidably mounted in said boring bar, and means for operatively connecting said control plunger and said cam in any of a plurality of longitudinally spaced positions.

32. A boring bar comprising a body member having a longitudinal groove therein, a cam member slidable in said groove, a boring tool carried by said boring bar and adapted to be adjusted by said cam, a control member slidably mounted in said boring bar, means for operatively connecting said control plunger and said cam in any of a plurality of longitudinally spaced positions, and yieldable means carried by said boring bar tending to withdraw said cutting tool against the surface of said cam.

33. A boring bar comprising a body member having a longitudinal groove therein, a cam member slidable in said groove, a boring tool carried by said boring bar and adapted to be adjusted by said cam, a control member slidably mounted in said boring bar, and means for operatively connecting said control plunger and said cam in any of a plurality of longitudinally spaced positions, and yieldable means tending to move said cam in a direction to permit the withdrawal of said tool.

34. In a device of the class described, a boring bar having a shank constructed and arranged to form a bayonet slot connection with a spindle, a plunger longitudinally slidable in said boring bar and adapted to contact a member carried by said spindle, spring means in said boring bar normally tending to cause said plunger to press against said member carried by the spindle and thereby take up the lost motion in said bayonet slot connection, a cutting tool adjustably carried by said boring bar, a cam member for adjusting the position of said cutting tool, means forming a connection between said cam member and said plunger whereby change of position of the member carried by the spindle will cause an adjustment of said cutting tool.

35. In combination, a spindle having a longitudinal bore, a boring bar slidably fitted in said bore, means forming a bayonet joint connection between said spindle and said boring bar, a cutting tool carried by said boring bar, a cam for adjusting the position of said cutting tool, a plunger slidably mounted in said boring bar, an operating connection between said plunger and said cam means, spring means mounted in said boring bar and tending to shift said plunger in a direction to cause the withdrawal of said cutting tool, and adjustable means carried by said spindle for limiting the withdrawing action of said plunger and thereby determining the inactive position of said tool.

JOSEPH SUNNEN.